(12) United States Patent
Reis et al.

(10) Patent No.: US 10,107,904 B2
(45) Date of Patent: Oct. 23, 2018

(54) METHOD AND APPARATUS FOR MAPPING AND CHARACTERIZING SEA ICE FROM AIRBORNE SIMULTANEOUS DUAL FREQUENCY INTERFEROMETRIC SYNTHETIC APERTURE RADAR (IFSAR) MEASUREMENTS

(71) Applicant: FUGRO N.V., Leidschendam (NL)

(72) Inventors: James J. Reis, New Market, MD (US); Carl Sonnier, Lafayette, LA (US); Joe Jones, Hagerstown, MD (US); Mark L. Sanford, Chambersburg, PA (US); Edward Saade, Frederick, MD (US)

(73) Assignee: Fugro N.V. (NL)

( * ) Notice: Subject to any disclaimer, the term of this patent is extended or adjusted under 35 U.S.C. 154(b) by 1204 days.

(21) Appl. No.: 13/961,567

(22) Filed: Aug. 7, 2013

(65) Prior Publication Data

US 2014/0062764 A1 Mar. 6, 2014

Related U.S. Application Data

(60) Provisional application No. 61/696,626, filed on Sep. 4, 2012.

(51) Int. Cl.
*G01S 13/90* (2006.01)

(52) U.S. Cl.
CPC ...... *G01S 13/9023* (2013.01); *G01S 13/9035* (2013.01); *G01S 2013/9076* (2013.01)

(58) Field of Classification Search
CPC ............ G01S 13/9023; G01S 13/9035; G01S 2013/9076

USPC ........................................................ 342/25 C
See application file for complete search history.

(56) References Cited

U.S. PATENT DOCUMENTS

| 5,341,142 A | 8/1994 | Reis et al. |
| 6,028,549 A * | 2/2000 | Buckreuss ............... G01S 7/36 |
| | | 162/196 |
| 7,095,359 B2 | 8/2006 | Matsuoka et al. |
| 2004/0143395 A1 | 7/2004 | Matsuoka et al. |
| 2007/0124079 A1 | 5/2007 | Mese et al. |

(Continued)

OTHER PUBLICATIONS

Rosen, et al., "Synthetic Aperture Radar Interferometry", Proceedings of the IEEE, vol. 88, No. 3, pp. 333-382, (Mar. 2000).

(Continued)

*Primary Examiner* — Timothy A Brainard
(74) *Attorney, Agent, or Firm* — Polsinelli PC

(57) ABSTRACT

X-band and P-band synthetic aperture radars are used to simultaneously gather swaths of reflected radar data over a specific area simultaneously. The P-band is used to penetrate surface clutter that may be on the top of an ice formation as well as to penetrate an ice mass. X-band is used to map surface clutter on the top of an ice formation as well as to map the top of snow that may appear on an ice formation. Digital elevation maps of the top of the snow or ice clutter, the top of the ice, and the bottom of the ice and or ice thickness are constructed. By summing these various digital elevation maps a measurement of the thickness of sea ice can be determined. Further analysis of DEM, MAG and CRV layers provides an indication of the quality of the ice, for example cracks and pressure ridges, and its weak points.

33 Claims, 8 Drawing Sheets

(56) References Cited

U.S. PATENT DOCUMENTS

| | | | |
|---|---|---|---|
| 2010/0171651 A1* | 7/2010 | Scheiber | G01S 7/2813 342/179 |
| 2010/0217563 A1 | 8/2010 | Montaron et al. | |
| 2012/0055674 A1 | 3/2012 | Sweatman et al. | |

OTHER PUBLICATIONS

Reis, et al., "Updating GeoSAR for Full-pol Interferometric Capability", 978-1-4244-2871-7/09, IEEE, pp. 1-6, (2009).

International Search Report and the Written Opinion of the International Searching Authority in International Application No. PCT/US2013/056154 dated Nov. 8, 2013.

International Report on Patentability (Chapter 1 of the Patent Cooperation Treaty) in International Application No. PCT/US2013/056154 dated Mar. 19, 2015.

Wade, "Airborne Measurement of Now Thickness Over Sea Ice", IEEE, IGARSS, pp. 222-225, (2008).

Hara, et al., "Application of Neural Networks for Sea Ice Classification in Polarimetric SAR Images", IEEE Transactions on Geoscience and Remote Sensing, vol. 33, No. 3, pp. 740-748, (May 1995).

Woo Kim, et al., "Characterization of Arctic Sea Thickness Using High-Resolution Spaceborne Polarimetric SAR Data", IEEE Transactions on Geoscience and Remote Sensing, vol. 50, No. 1, pp. 13-22, (Jan. 2012).

Metelkin, et al., "Ditigal Processing by Sea Ice Thickness Measuring", Riga Institute of Civil Aviation Engineers, IEEE, pp. 2481-2482, (1991).

Rodriguez-Morales, et al., "Development of a Multi-Frequency Airborne Radar Instrumentation Package for Ice Sheet Mapping and Imaging", IMS, IEEE, University of Kansas, Center for Remote Sensing of Ice Sheets, pp. 157-160, (2010).

Scheuchl, et al., "Model-Based Classification of Polarimetric SAR Sea Ice Data", Dept. of Electrical and Computer Engineering, et al., pp. 1-3.

Nakamura, et al., "Observation of Sea-Ice Thickness in the Sea of Okhotsk by Using Dual-Frequency and Fully Polarimetric Airborne SAR (Pi-SAR) Data", IEEE Transactions on Geoscience and Remote Sensing, vol. 43, No. 11, pp. 2460-2469, (2005).

Scheuchl, et al., "Sea Ice Classification Using Multi-Frequency Polarimetric SAR Data", Dept. of Electrical and Computer Engineering, et al., pp. 1-3.

Holt, et al., "Sea ice thickness measurements by ultrawideband penetrating radar. First Results", Cold Regions Science and Technology, www.elsevier.com/locate/coldregions, vol. 55, pp. 33-46, (2009).

Crocker, et al., "A Sensor Package for Ice Surface Observations Using Small Unmanned Aircraft Systems", IEEE Transactions on Geoscience and Remote Sensing, vol. 50, No. 4, pp. 1033-1047, (Apr. 2012).

Yu, et al., "Unsupervised Polarimetric SAR Image Segmentation and Classification Using Region Growing With Edge Penalty", IEEE Transactions on Geoscience and Remote Sensing, vol. 50, No. 4, pp. 1302-1317, (Apr. 2012).

Gogineni, et al., "An Ultra-wideband Radar for Measurements of Snow Thickness Over Sea Ice", Radar Systems and Remote Sensing Laboratory, ITTC, IEEE, pp. 2802-2804, (2003).

Kanagaratnam, et al., "Ultrawideband Radar Measurements of Thickness of Snow Over Sea Ice", IEEE Transactions on Geoscience and Remote Sensing, vol. 45, No. 9, pp. 2715-2724, (Sep. 2007).

Panzer, et al., "Ultra-Wideband Radar Measurements of Snow Thickness Over Sea Ice", Center for Remote Sensing of Ice Sheets at University of Kansas, IGARSS, pp. 3130-3133, (2010).

Osuna, "L7: Kernel Density Estimation", http://research.cs.tamu.edu/prism/lectures, CSCE 666 Pattern Analysis, pp. 1-26.

Osuna, "L28: Kernel-Based Feature Extraction", http://research.cs.tamu.edu/prism/lectures, CSCE 666 Pattern Analysis, pp. 1-21.

* cited by examiner

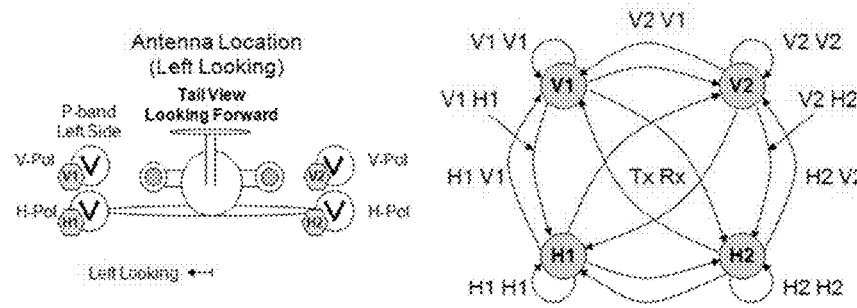
FIG.1A
Prior Art
FIG.1B
Prior Art
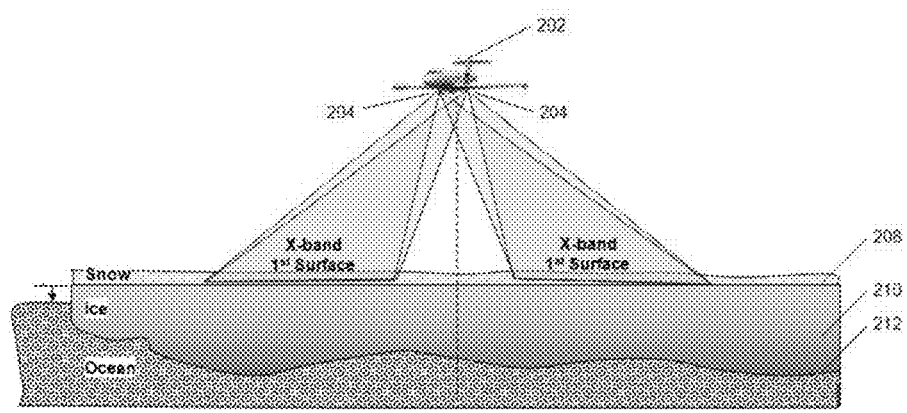
FIG.2

METHOD AND APPARATUS FOR MAPPING AND CHARACTERIZING SEA ICE FROM AIRBORNE SIMULTANEOUS DUAL FREQUENCY INTERFEROMETRIC SYNTHETIC APERTURE RADAR (IFSAR) MEASUREMENTS

CROSS REFERENCE TO RELATED APPLICATIONS

This application claims the benefit of Provisional Application No. 61/696,626 filed on Sep. 4, 2012. The 61/696,626 is incorporated by reference herein, in its entirety, for all purposes.

BACKGROUND

Interferometric synthetic aperture radar (IFSAR, also abbreviated as InSAR) is a specialized radar technique for using phase interferometer methods between two spatially displaced high resolution (complex) SAR images to generate high quality terrain elevation maps called digital elevation maps (DEMs). The high spatial resolution of IFSAR imagery enables independent measurements of terrain elevation on a dense grid of sample points on the order of several decimeters to several 10s of meters. Furthermore, the use of active microwave radar as the sensor of choice inherently provides a (nearly) all-weather, day/night capability to generate orthorectified magnitude imagery and DEMs.

SAR systems use antennas that are designed to transmit and receive electromagnetic waves over a particular band and of specific polarization(s). It is well known that interactions between the incident transmitted wave and illuminated ground objects, the backscattered (reflected) wave can change the polarization of the scattered wave to be different from the polarization of the incident wave. Therefore, the radar antennas are often designed to simultaneously receive the different polarization components of the EM wave. For example, SAR antennas are frequently designed to generate electromagnetic waves with both horizontal (H) and vertical (V) linear polarizations. While only one polarization is transmitted from a single antenna at any given time both the H and V parts of the antenna(s) can receive the H and V components of the backscattered signal (the system electronics keep these signals separate). An exemplary collection platform for permitting single-pass full polarimetric SAR data is disclosed in the article entitled "Updating GeoSAR for full-Interferometric Capability," IEEE Radarcon09 978-1-4244-2871, Jul. 9, 2012, which is incorporated herein in its entirety for its teaching of placement and types of sensors installed on an aircraft for such collection.

Single-pass, full-polarimetric (or "full-pol") interferometry requires transmission and reception from two antennas in two polarizations. Transmission/reception diagrams are used to designate how the polarimetric data is acquired. FIG. 1 diagrams the possibilities. The circle (node) corresponds to an antenna, e.g., H1 corresponds to horizontal polarization for antenna-1, V2 corresponds to vertical polarization for antenna-2. The arcs connecting the nodes correspond to backscattered transmitted energy, the tail being the transmitting antenna, and the head being the receiving antenna. In general, the backscattered energy from each transmitted pulse can be received by each of the four antennas, therefore if all antennas are used (sequentially) for transmission and all antennas are used (simultaneously) for reception, then a maximum of 16 raw data channels are available for recording and image formation.

If the same-side antenna is used for both transmit (TX) and receive (RX), then the antenna index is dropped, since its physical location is specified. For example, for signals emanating from/to the same antenna, these shortened identifiers are frequently used, where the antenna location is understood:

HH—for horizontal transmit and horizontal receive,
VV—for vertical transmit and vertical receive,
HV—for horizontal transmit and vertical receive, and
VH—for vertical transmit and horizontal receive.

When transmit and receive polarizations are the same, this is referred to as co-polarized (e.g., HH, VV); and, similarly, when the transmit and receive polarizations are the opposite this is referred to as cross-polarized (e.g., HV, VH). Cross-polarized signals are orthogonal to one another. The above discussion is based on linear polarizations, but the same principle applies if the two polarizations are right and left circularly polarized. If all the returns are acquired, circularly polarized signals mathematically can be converted to linearly polarized equivalents, and vice versa.

The ability to characterize sea ice is becoming increasingly important. The makeup of ice that covers various surfaces of the globe has been continually changing. However, the changing ice coverage and the characteristics of that ice have changed dramatically in recent years such that navigation of Polar Regions can now be accomplished. Further development of resources in these regions is also receiving additional attention.

Both environmental concerns and natural resources concerns have a great deal of interest in measuring and characterizing those regions of the earth that have some degree of ice coverage. For example, entities that are involved in the drilling and production of oil and gas in marine environments, especially those in Polar Regions, have a particular interest. In particular, when drilling and producing oil in arctic conditions, sea ice can pose a threat to both structures and personnel. Thus, the structure, thickness and location of this sea ice are critical components of the safety management plan.

Attempts using SAR and IFSAR have been made at measuring and characterizing sea ice. These have occurred using mostly satellite-based X-band systems, and to a much more limited extent, airborne systems. Further, there have been some examples of using interferometric SAR to map the top of ice through a few decimeters of dry snow. These systems can only characterize new from first-year and multiyear ice. However, such systems do not measure ice thickness.

Currently, ice thickness measurements are typically acquired by collecting profiles using low flying profiling radar systems or deploying on-ice tools, such as sled-based ground penetrating radar and drilling core samples. These systems, while very accurate, provide data coverage over very small areas.

SUMMARY

Embodiments illustrated herein are directed to systems and methods that can both categorize types of sea ice and provide measurements of the thickness of multiyear ice over a wide area. For purposes of this application we will refer to "Arctic" operations with the understanding that such operations are not limited to the northern hemisphere but rather can also equally be applied to other ice filled regions. In an embodiment, a dual frequency (X- and P-band) single-pass interferometric airborne IFSAR system is utilized to collect information in a near simultaneous fashion. Band choice is not limited to X and P, but logically can be extended to K, Ku, L, and HF and beyond, where one of the bands is of short wavelength and the other is (relatively) long wavelength.

IFSAR data collection operations can be characterized as single-pass or repeat pass, with two-pass being the norm. In single-pass processing, a platform with two physically displaced apertures each with an independent coherent receiver, collects all of the radar data needed in a single pass to generate a digital elevation model of the ice. The (two or more) SAR images are formed from the (two or more) receiver outputs. The key advantages of single-pass operation are (a) the relative ease of antenna motion compensation, and (b) the absence of temporal decorrelation (due to ice movement) between the two (or more) images.

P-band IFSAR can be used to penetrate ice to 5 to 10 meters or more. For many applications, knowing the extent of ice that has a thickness of 5 meters or beyond is extremely useful in determining what threats might exist to navigation and infrastructure in an Arctic Region. Additionally, when coupled with a first-surface model from the concurrent measurement of an X-band IFSAR, a better estimate can be made of the thickness of ice. Together, the use of concurrent, single-pass X-band and P-band synthetic aperture radars can provide an estimate of the ice thickness. Further, other characteristics of data returned from such sensors can characterize the sea ice beyond its thickness, as more fully set forth herein.

Additionally, a "Volumetric Decorrelation" factor (CRV) of the X-band and P-band data provides another useful ice discrimination factor from which to characterize ice. Volumetric decorrelation is a normalized measure of the vertical extent of features that scatter incoming radar waves within a resolution element.

Further, P-band SAR imagery provides additional detail that allows mapping of the ice structure for a sea ice analyst.

Thus, the various embodiments illustrated herein provide a method of using full polarimetric, single-pass P-band interferometric SAR data and to map depth horizons within sea ice. The method further involves combining the data from the P-band SAR collection with simultaneously collected, single-pass interferometric SAR data at a higher frequency, such as X-band to map the thickness of multiyear sea ice.

The various embodiments illustrated herein provide methods for utilizing the decorrelation (CRV) surface layer that results from interferometric processing of the P-band and X-band SAR data as additional inputs for the classification of ice into new, first year and multiyear.

Further, the various embodiments illustrated herein provide methods of utilizing the decorrelation (CRV) surface and the ice classification as a quality factor for determining the spatial validity of the results of classification of the ice as new, first year, and multiyear ice.

The system further provides for a method of using P-band SAR backscattered return (MAG) and the CRV surface to map ice structure and weak points.

The various functions of the embodiments illustrated herein may be accomplished using an airborne, single pass, full polarimetric P-band synthetic aperture radar with simultaneously collected single pass, polarimetric X-band synthetic aperture radar. During the single pass, two wide overlapping swaths of IFSAR imagery are collected over an area of ice thereby eliminating temporal decorrelation that results from the movement of ice that ordinarily occurs with repeat pass data collection methods.

DESCRIPTION OF THE DRAWINGS

FIGS. 1A and 1B illustrate typical sensor antenna locations and transmit/Receive combination.

FIG. 2 illustrates X-band SAR collection according to an embodiment.

DETAILED DESCRIPTION

Figure 3:
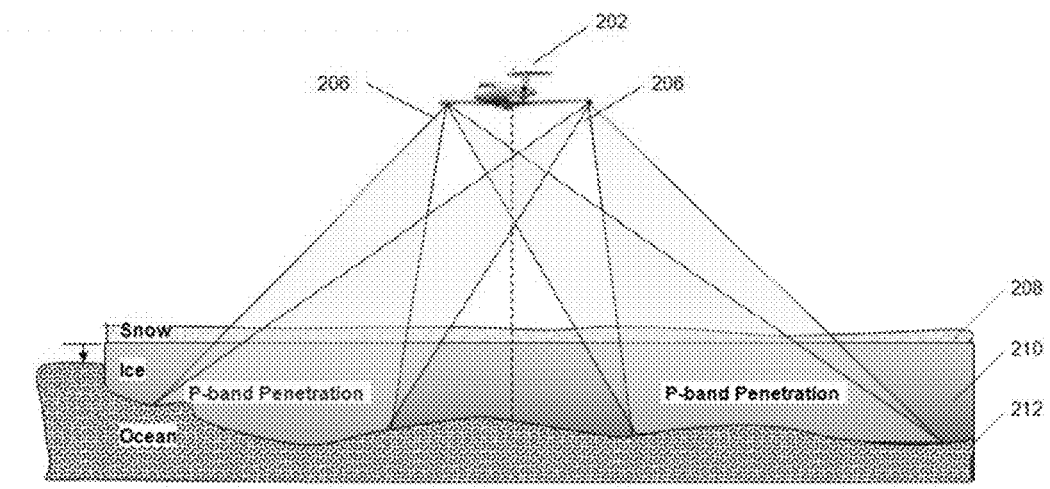
FIG. 3 illustrates P-band SAR collection according to an embodiment.

Embodiments illustrated herein are directed to systems and methods that can both categorize types of sea ice and provide measurements of the thickness of multiyear ice over a wide area. In an embodiment, a dual frequency (X- and P-band) single-pass interferometric airborne IFSAR system is utilized to collect information in a near simultaneous fashion.

The X-band SAR magnitude of returns is most affected by surface clutter that occurs with irregular surface ice. However, P-band horizontal/horizontal (HH) polarization returns and P-band vertical/vertical (VV) polarization returns penetrate the surface clutter that exists on ice, as well as penetrate the ice itself and thus can reveal details of surface and internal cracking of an ice floe or other large body of ice (the terms "ice floe" and "large body of ice" are used herein interchangeably).

Further, there are large differences between X-band and P-band in the Volumetric Decorrelation Layer (CRV) for the same area of ice. Since the decorrelation layer (CRV) is sensitive to volumetric clutter (affecting vertical scattering) over a resolution cell, the 3 cm X-band wavelength should be less sensitive to volumetric clutter than the 85 cm P-band wavelength. Thus, large cross-band differences between the CRV layers are expected, with X-band being dominated by small scale (centimeter sized) surface features and P-band dominated by large scale (meter sized) volumetric features. When considered jointly, the CRV layer from the two sensors provide distinguishing information about the nature of the ice being measured at that location.

Similarly to CRV cross band features, the appearance of the magnitude of the backscattered data also shows significant cross band textural differences due to the ~30× differences in imaging wavelengths. Therefore, P-band SAR (both polarizations) provides a much smoother surface appearance for the same area that would be sensed by the X-band SAR data. Since P-band penetrates any surface snow and small scale surface clutter, P-band reveals surface cracking not evident in X-band. P-band VV SAR data decorrelates less than X-band data, and, therefore, provides a smoother appearance for the same area than that sensed by the X-band SAR.

Based upon review of data collected during experimentation, P-band HH polarized SAR data penetrates ice more effectively than does P-band VV polarized SAR data. This provides the ability to more readily visualize cracks in the ice at various points.

In an embodiment, a full polarmetric P-band interferometric synthetic aperture radar is used. Further, an X-band interferometric synthetic aperture radar collects data simultaneously with the P-band SAR. Since X-band and P-band data is collected simultaneously, such collection allows direct comparison between P-band and X-band data under the exact geometric and temporal viewing conditions entailing complete assurance that the same area of ice simultaneously is being imaged by both sensors. This enhances the ability to spatially and temporally register the SAR image data layer in both bands since ice floe movements between repeat pass data collections is eliminated.

Typically, the SAR data is collected at (about) 0.5 m along track sampling with 1 m slant-track range resolution. Precision GPS navigation and inertial measurement orientation data is collected and for use in processing the IFSAR data from the P and X-band sensors.

The data are collected over a wide area (typically 10 km wide swaths, several hundreds of kilometers in length) using the X and P-band SARs in a single-pass interferometric acquisition. Since sea ice can move quite rapidly (several hundred meters/hour), single pass acquisition eliminates problems associated with prior art based on multipass collections.

Referring now to FIGS. 1A and 1B, sensor antenna locations and transmit/receive combinations for SAR data are illustrated. In an embodiment, full polarmetric interferometric P-band is collected consisting generally of the 16 polarization channels illustrated in FIG. 1B and comprising horizontal/horizontal (HH), vertical/vertical, (VV) and horizontal/vertical (HV) are minimally collected although this is not meant as a limitation. It will be apparent to those of ordinary skill in the art that specific polarization channels among the 16 possible combinations may also be collected depending upon the data to be extracted. In an embodiment, the collection of multiple polarizations captures different electromagnetic interaction with the ice being sensed. Thus the different polarizations can yield different types of ice data useful for ice classification and thickness characterization.

Figure 6:
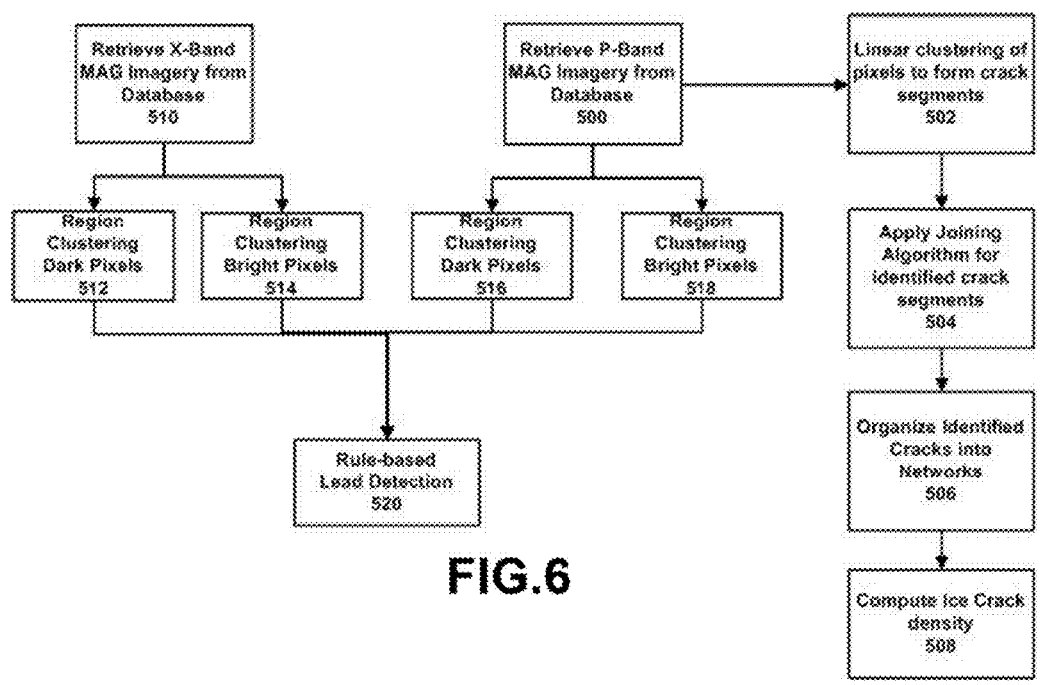
FIG. 6 is a block diagram illustrating a data processing work flow for ice characterization according to an embodiment.

Referring now to FIG. 2 and to FIG. 6, the operation of X-Band radars of an embodiment is illustrated. In this embodiment, an aircraft 202 carries a series of sensors, in particular, but without limitation, left and right looking X-band radars 204 as illustrated in FIG. 2 and left and right looking P-band radars 206 as illustrated in FIG. 6. As noted above, the X-band radar images the surface of the ice where it maps surface features of the ice, including dry snow cover from two horizontally displaced antennas enabling single-pass IFSAR processing of the data. The X-band radar backscattered returns from both antennas from the surface of the ice 208 are acquired for IFSAR processing. The X-band radar does not significantly penetrate the ice/water interface 208 and 212.

Referring now to FIG. 3, the operation of P-Band radars of an embodiment are illustrated. P-band radars 206 operates at the same time as the X-band radars, however, the P-band radar has ice penetrating capabilities, and, therefore, can image the ice/water volume between interfaces 208, and 212. The P-band radar receives backscattered returns on horizontally displaced antennas enabling single-pass IFSAR processing of the data. The P-band system is capable of transmitting and receiving both horizontally and vertically polarized returns. These returns can emanate from reflections off the boundary between the bottom of the ice and the water/land 212 and internal reflections from dielectric irregularities in the ice itself. Depending on the makeup of the ice, penetration and reflections of 10 m and more have been observed. If the ice is very much thicker than this, then insufficient energy may be returned back to the sensor to generate a DEM value. In this case, the region is marked as "Void."

In an embodiment, X-band and P-band single-pass interferometric SAR data are simultaneously acquired in a process to determine ice thickness estimates and to characterize sea ice into new, first, multiyear ice. Further, for multiyear ice, the ice penetration characteristics of P-band data, when used in conjunction with X-band data provides an estimate of ice thickness. Further analysis of P-band and X-band data provides information of the structure of the sea ice.

Figure 4:
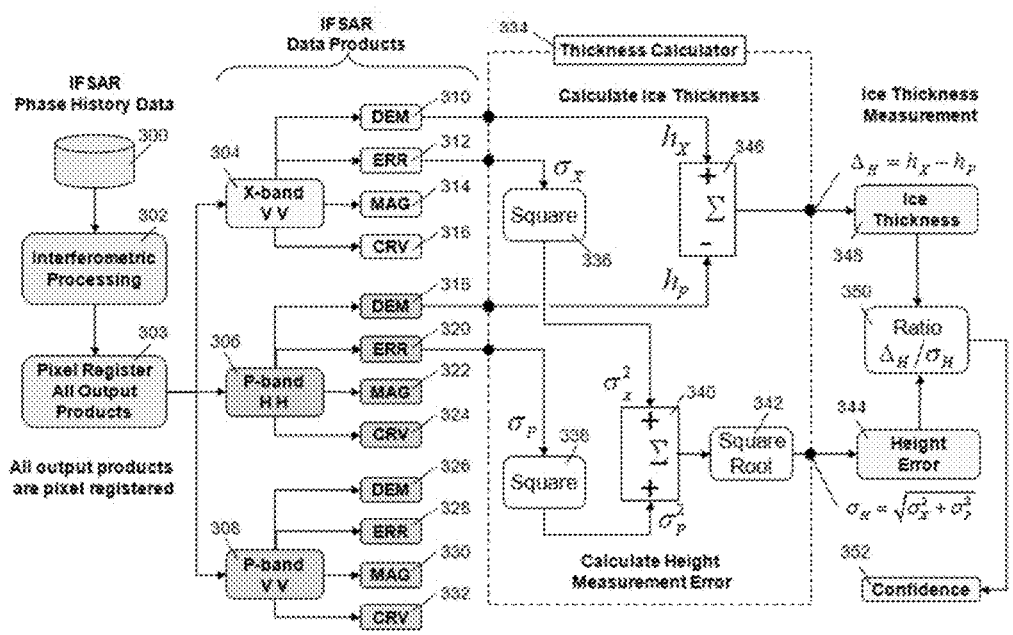
FIG. 4 is a block diagram illustrating a data processing work flow for ice thickness determination according to an embodiment.

Referring now to FIG. 4, a data processing work flow for ice thickness determination is illustrated. After collecting the initial data into a database 300, the system processor performs synthetic aperture interferometric processing 302 on both the X and P-band SAR data. The various interferometric products are pixel registered, 303. This is done for both X-band VV SAR data 304, P-band HH data 306 and the P-band VV data 308. The interferometric processing outputs several useful data layers that are pixel registered geographically to the ice at the time of the acquisition. During this processing step, the two horizontally separated antenna channels are combined inteferometrically to generate several output data layers.

From this processing, multiple data layers are created, such as digital elevation maps (DEM) 310, 318, and 326; height error maps (ERR) 312, 320, 328; radar magnitude (MAG) maps 314, 322, and 330; and, volumetric decorrelation (CRV) maps 316, 324, and 332 for the X-band data channel and for the two P-band copolarized channels (HH and VV). Without limitations, additional channels are processed in an identical manner, generating corresponding output layers. All of these channels are geographically pixel coregistered, where the pixel size is typically 5 m by 5 m, but can be greater or less.

As noted above, the system processor performs interferometric processing on the X-band SAR data, which creates a digital elevation map (DEM) 310 of the surface of the topmost layer of the ice related to absolute ellipsoidal height. A height error map (ERR) 312 is also created, which estimates the uncertainty in the DEM measurement based on the interferometric coherence of the return signals used to generate the DEM. If the ice is covered by wet snow, this DEM surface will be very near the top of snow; but it the snow is very dry (as is usually the case in the arctic), then the X-band surface coincides closely with the top of the ice.

The system processor also performs interferometric processing on the P-band SAR data. This, in turn, creates a digital elevation surface relative to the absolute ellipsoidal height from each of the HH 318 and VV 326 polarizations. A height error map (ERR) 320, 328 is also created for each polarization, which is an estimate of the uncertainty in the respective DEM measurement based on the interferometric coherence of the return signals used to generate the DEM. This elevation "surface" is an indication of the depth or thickness of the ice. The returns from the P-band data are affected by the properties of the ice, including its salinity, density, volumetric irregularities, and thickness.

Referring again to FIG. 4, the processor employs a thickness calculation algorithm 334 for determining ice thickness at the various images locations. Utilizing the results of the interferometric processing, elevation models are created for the top of ice based on the X-band DEM 310, and for the penetration depth based on the P-band HH DEM 318. Subtracting in summer unit 346, the P-band HH DEM 318 from the X-band DEM 310 thereby providing a direct measure of ice thickness, 348. The total uncertainty of the ice thickness 344 is estimated by computing the square root 342 of the sum 340 of the squares 336, 338 of the height error 312, and 320 associated with their respective DEMS. This measure distinguishes between meaningful ice thickness measures and those dominated by low signal to noise. The ratio of the height thickness to the total height error 350 is a statistical figure of merit, where ratios >3 (greater than 3), means the ice thickness measurement 348 can be used with high confidence 352.

The thickness calculator 334 is general and can be used for other input layers where differences are desired, such as the P-band height difference between the VV and HH polarizations. Similarly, the confidence ratio 350 for these measurements is also available.

For any edges of the ice that are directly adjacent to water, the X-band system can directly measure the ice freeboard, 214, in the same coordinate system as the other of the DEM measurements, 310, 318, 326. Further, the ice freeboard can be input into a model based on the ice buoyancy to independently estimate ice thickness.

Figure 5A:
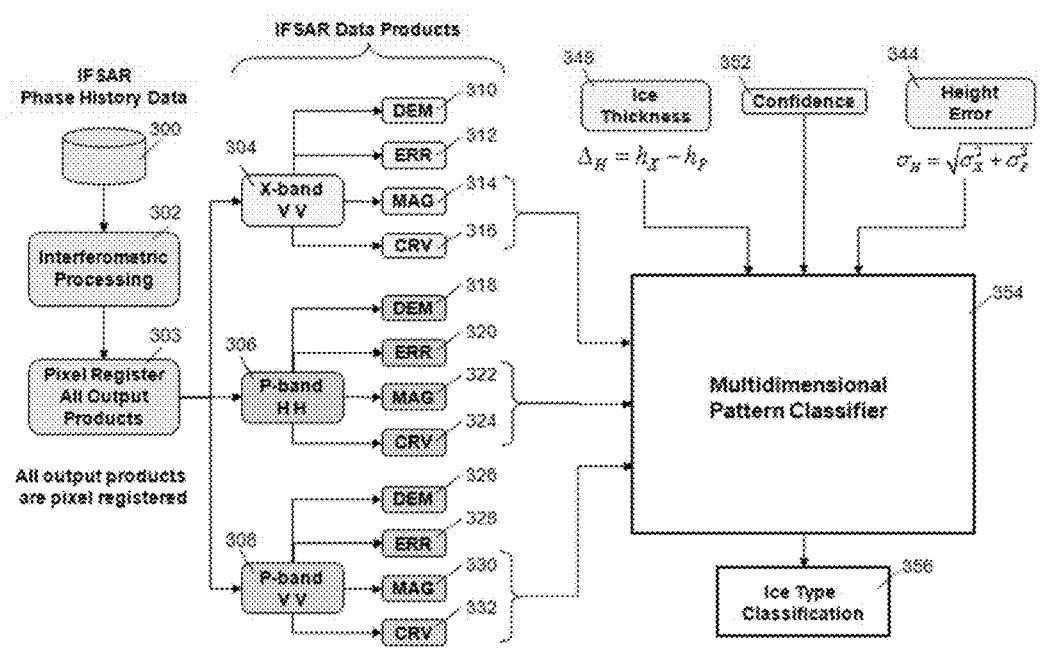
FIG. 5A is a block diagram illustrating a data processing work flow for ice characterization according to an embodiment.

Referring now to FIG. 5A, utilizing the SAR data for ice classification is illustrated. Utilizing the magnitude (MAG) 314, 322, 330, and CRV (volumetric decorrelation) results 316, 324, 332 of the processing of the X-band and P-band radar returns, the ice thickness estimate, 348 the height error estimate, 344, and the confidence ratio 352, it is possible to jointly analyze these returns in a multidimensional classifier 354 to identify ice type signatures, 356 indicative of first year and multiyear ice. These signatures are a combination of the magnitude and decorrelation results from each of the collected bands, six layers in this embodiment, plus the ice thickness estimate, 348 and the height error estimate, 344, and confidence ratio 352. Comparing these signals to ground truth provides a reference signature typifying different ice types. In effect, each different ice type is recognized by a combination of signatures from the DEM, magnitude and decorrelation returns generated across X-band and P-band, including polarization diversity. Thus, a multiplicity of returns features are jointly combined to characterized each different type of ice in order to create a signature for the type of ice of interest.

Figure 5B:
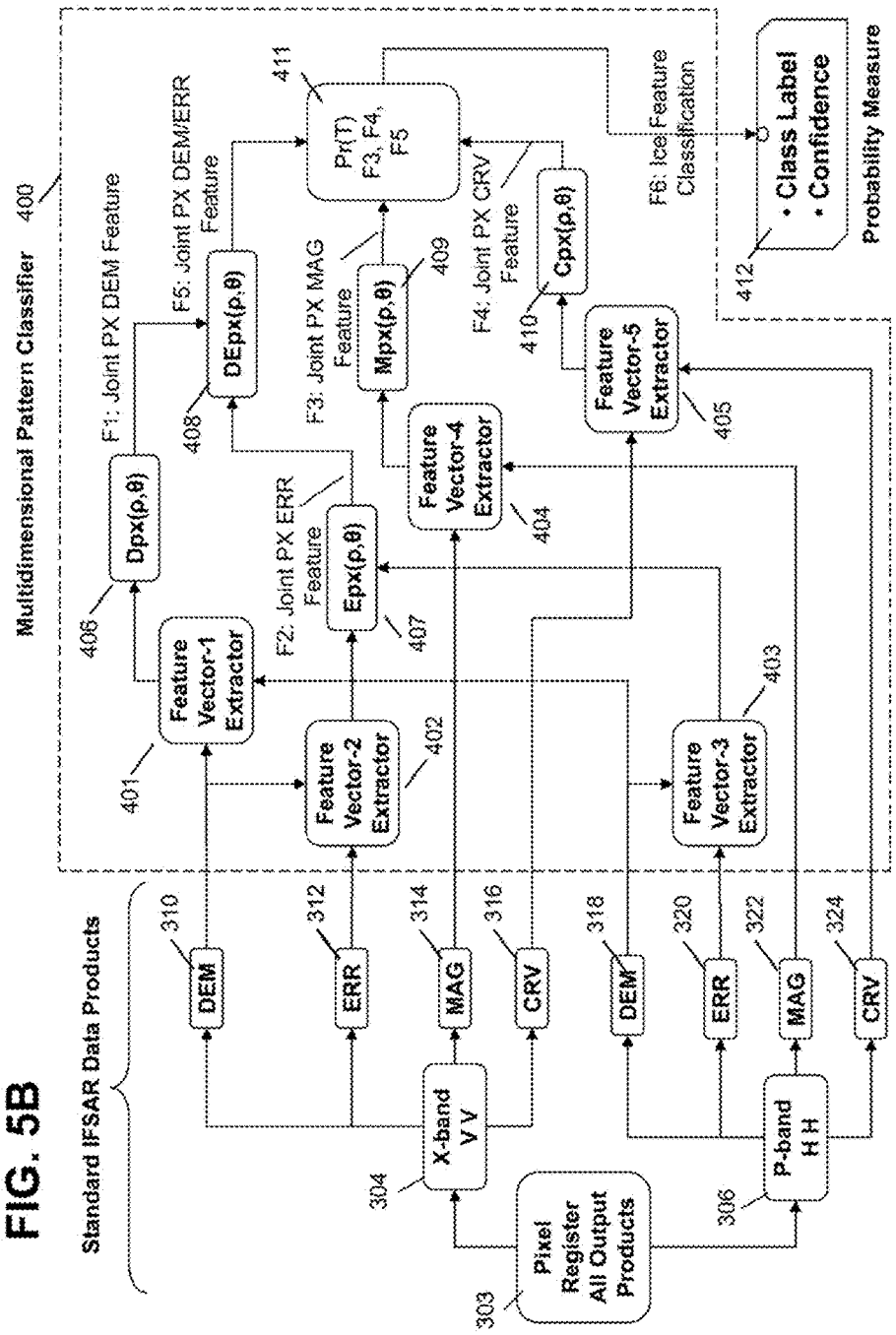
FIG. 5B is a block diagram illustrating a multidimensional classifier according to an embodiment.

FIG. 5B is a block diagram illustrating a multidimensional classifier according to an embodiment. A multidimensional classifier 400 takes as inputs various interferometric output products 310-324 generated in the processing chain described above. These interferometric data products, 310-324, are combined in pairs forming five different feature vectors 401-405, as follows:

1. Feature Vector-1, 401, takes as input the digital elevation model (DEM) terrain height derived from interferometric processing of X-band, 310, and P-band, 318, which are transformed to a feature vector according to the following rule:

$$V1(\rho_{DEM}, \theta_{DEM}), \text{ where } \rho_{DEM} = \sqrt{P_{DEM}^2 + X_{DEM}^2}; \theta_{DEM} = \arctan(P_{DEM}, X_{DEM}) \quad (1)$$

$\rho_{DEM}$=the vector magnitude of the MAG values, and $\theta_{DEM}$=the polar angle associated with this magnitude. This transformation captures the joint DEM heights in $\rho_{DEM}$, a larger value meaning a larger overall DEM height in one or both bands. Individually, the P and X DEM magnitudes can be positive or negative, therefore, $-\pi \leq \theta_{DEM} \leq \pi$; $\theta_{DEM}$ captures the vector angle between the two DEMs. For example: $\theta_{DEM} \approx 0$ corresponds to the X DEM being positive and much larger than the P DEM; $\theta_{DEM} \approx +\pi/2$ (i.e. +90-deg) corresponds to the P-band DEM being positive and much larger than the X-band DEM; and $\theta_{DEM} \approx -\pi/2$ (i.e. -90-deg) corresponds to the P-band DEM being strongly negative compared to the X-band DEM. From phenomenological considerations, in multiyear ice we would expect the P-band DEM to be strongly negative relative to X-band, however, in first year ice where the brine content is significant, we would expect penetration into the ice to be reduced.

2. Feature Vector-2, 402, takes the X-band height, 310, and X-band height error, 312, as input and generates as output a normalized measure of X-DEM height above the X-DEM noise level according to the following rule:

$$V2(z) = X_{DEM}/\hat{\sigma}_X, \text{ where } \hat{\sigma}_x = \max(X_{ERR}, \sigma_o^X) \quad (2)$$

Note: X-band height error is never zero because of finite signal to noise ratios associated with the interferometric processing, nevertheless, a lower bound on $\hat{\sigma}_X$ is provided by $\sigma_o^X \approx 0.2$ m.

3. Feature Vector-3, 403, is the P-band equivalent to Feature Vector-2, hence, the P-band height, 318, and P-band height error, 320, are taken as inputs and generates as output a normalized measure of P-DEM height above the P-DEM noise level according to the following rule:

$$V3(z) = Y_{DEM}/\hat{\sigma}_P, \text{ where } \hat{\sigma}_P = \max(P_{ERR}, \sigma_o^P) \quad (3)$$

Note: P-band height error is never zero because of finite signal to noise ratios associated with the interferometric processing, nevertheless, a lower bound on $\hat{\sigma}_y$ is provided by $\sigma_o^P \approx 0.2$ m 4. Feature Vector-4, 404, takes as input the reflectance magnitude derived from interferometric processing of X-band, 314, and P-band, 322, which are transformed to a feature vector according to the following rule:

$$V4(\rho_{MAG}, \theta_{MAG}), \text{ where } \rho_{MAG} = \sqrt{P_{MAG}^2 + X_{MAG}^2}; \theta_{MAG} = \arctan(P_{MAG}, X_{MAG}) \quad (4)$$

$\rho_{MAG}$=the vector magnitude of the P and X MAG values, and $\theta_{MAG}$=the polar angle associated with this magnitude. This transformation captures the joint MAG brightness levels in $\rho_{MAG}$, a larger value meaning a larger overall MAG brightness in one or both bands. Since the P and X magnitudes can only be positive, $0 \leq \theta_{MAG} \leq \pi$; $\theta_{MAG}$ captures the angle between the two MAGs, where $\theta_{MAG} \approx 0$ corresponds to the X-band MAG being much brighter than the P-band MAG; $\theta_{MAG} \approx \pi/2$ (90-deg) means that the P-band MAG is much brighter than the X-band MAG; and $\theta_{MAG} \approx +\pi/4$ (45-deg) means that the P and X-band MAGs are equally bright. From phenomenological considerations, in multiyear ice we would expect the P-band MAG generally to be less bright relative to X-band, while in first year ice, the MAGs in both bands are relatively bright, since less P-band energy is penetrating the ice surface.

5. Feature Vector-5, 405, is similar to feature vector-4, except the inputs are X-band CRV (Volumetric decorrelation), 316, and P-band CRV, 324. This feature vector is formed by the following rule:

$$V4(\rho_{CRV}, \theta_{CRV}), \text{ where } \rho_{CRV} = \sqrt{P_{CRV}^2 + X_{CRV}^2}; \theta_{CRV} = \arctan(P_{CRV}, X_{CRV}) \quad (5)$$

Volumetric decorrelation is a normalized measure taking on values between 0 and 1. CRV is a measure of the vertical scattering occurring within an IFSAR resolution cell. CRV at X-band is very low due to high levels of surface scattering, while at P-band CRV can be quite high due to multiple scattering through out the ice volume, especially in multi-year ice where the brine has been largely washed out of the ice, making it much more transparent at P-band. Low values of $\rho_{CRV}$ are indicative of first year ice, when the brine content is still rather high. Although P-band ice penetration is significantly reduced under these conditions, it still penetrates significantly deeper than does X-band, all things being equal.

Elements 406-410 are low dimensional classifiers which map their input feature vector into a probability measure over the decision classes of interest for a particular application. Classifier robustness in remote sensing applications is critically dependent on avoiding the well known and problematic issue of 'over training', where the available training set is much too small to infer the nuances of the underlying decision surface. For example, suppose the eight raw data inputs, 310-324, are used simultaneously in an eight dimensional feature vector, without further partitioning. For illustrative purposes, let us suppose that the DEM and ERR inputs are 5-bit numbers (i.e., they can take on 32 statistically significant values), let the two CRVs be 4-bit inputs and the MAGs be 6 bit inputs: all totaled, there are 4*5+2*4+2*6=40 bits of data, which means that the pattern space is capable of discerning $2^{40}$ bits=1,099,511,627,776≈1-trillion different input patterns; if the classifier is making a category decision (e.g., is the input multiyear ice greater than 4 m thick), then each of these trillion patterns are assigned a probability of the likelihood that this assertion is TRUE, and a confidence bound of the assigned probability.

Heuristically trained classifiers use paradigm examples representative of the decision classes. From these exemplars, the class membership of all trillion patterns is inferred via some form of extrapolation (generalization) from the small set of training exemplars. The more complicated the decision surface, the more critical and numerous the training patterns needed to accurately characterize it. When too few training examples are used to train the classifier, the classifier essentially memorizes the training set and does not obtain the desired generalized solution—this is called over training and it accounts for large performance discrepancies when the 'perfectly trained' classifier is applied to new input data and its false alarm and missed detecting rates are found unacceptable.

One way to significantly reduce this problem is to partition the input feature space into several subsets of input features which tend to extract different kinds of information. Each subset is treated as a lower dimensional classification problem in its own right, and each is trained using the same training set. For example, suppose three subsets are chosen, with subset-1 taking the DEMS and ERR (20-bits); subset-2 taking the two CRV measures (8-bits); and subset-3 taking the two MAGs (12-bits). The total number of input patterns is now $2^{20}+2^{8}+2^{12}$=1,048,576+256+4,096 patterns, which is a million times smaller than the original problem. However, we now combine the decision outputs from the three subsets classifiers as input into a combining classifier to generate the combined joint decision. Each of the classifiers output decisions are formulated as a statistical probability that their input pattern corresponds to the desired output class. These output probabilities acts like a new abstract feature, capturing the essential information contained in its input features, but with considerably reduced variability. If these outputs are specified to ~2%, i.e., 6-bits, then the final combiner classifier has three 6-bit input features, (262,144 patterns).

In hierarchical fashion, the original training set is reused for a fourth time to construct the final output decision surface, 411. In this fashion, we have transformed a single intractable high dimensional classification problem into four manageable low dimensional problems. There is no free lunch, here, because the subset classifiers, must be 'well behaved', i.e., their output probabilities must be correlated for the desired input patterns and uncorrelated for unwanted input patterns. This critical partitioning constraint is relatively easy to come by if the input features can be selected to extract different kinds of input information, for example, DEM, MAG, and CRV.

In an embodiment, the five low dimensional classifiers, 406-410, may each be trained via the same training sample set to detect the presence a specified target ice feature, T, as entailed by the training set exemplars.

1. The DEM subclassifier, 406, takes the two dimensional Feature Vector-1, 401, and maps its range of input values into a probability of detection of ice feature T. Although other well known methods can also be useful, such as k-nearest neighbors, decision trees, and Bayesian classifiers, the preferred methodology for determining this mapping is the method of Kernel Density Estimation (KDE):

$$F1=Pr(T|V1)=\text{KDE}_{DEM}[V1(\rho_{DEM},\theta_{DEM})]=\text{probability of } T \text{ given } V1 \text{ KDE}_{DEM}=2D \text{ Kernel Density window for the DEMs} \quad (6)$$

2. The Height Error Classifier, 407, takes feature Vectors-2, 402, and Feature Vector-3, 403, as input and maps their joint range in a probability of detection of ice feature T:

$$F2=Pr(T|V2,V3)=\text{KDE}_{ZERR}[V2(za),V3(zb)]=\text{probability of } T \text{ given } V2 \text{ and } V3 \text{ KDE}_{ZERR}=2D \text{ Kernel Density window for the } P \& X \text{ ERR features} \quad (7)$$

3. The MAG subclassifier, 409, takes the two dimensional Feature Vector-4, 404, and maps its range of input values into a probability of detection of ice feature T:

$$F3=Pr(T|V4)=\text{KDE}_{MAG}[V1(\rho_{MAG},\theta_{MAG})]=\text{probability of } T \text{ given } V4 \text{ KDE}_{MAG}=2D \text{ Kernel Density window for the MAGs} \quad (8)$$

4. The CRV subclassifier, 410, takes the two dimensional Feature Vector-5, 405, and maps its range of input values into a probability of detection of ice feature T:

$$F4=Pr(T|V5)=\text{KDE}_{CRV}[V1(\rho_{CRV},\theta_{CRV})]=\text{probability of } T \text{ given } V5 \text{ KDE}_{CRV}=2D \text{ Kernel Density window for the CRVs} \quad (9)$$

5. The joint PX DEM/ERR subclassifier, 408, takes the two probability features F1 and F2 as input and maps its range of input values into a joint probability of detection of ice feature T:

$$F5=Pr(T|F1,F2)=\text{KDE}_{DEM/ERR}[F1(z1),F2(z2)]=\text{probability of } T \text{ given } V2 \text{ and } V3 \text{ KDE}_{DEM/ERR}=2D \text{ Kernel Density window for joint PDF of } F1 \text{ and } F2$$

In an embodiment, the final feature output classifier, 411, takes the three probability features, F3, F4, and F5 and maps their joint range of input values into a total probability of detection of ice feature T, given all of the preceding sensor data:

$$F6 = Pr(T \mid F3, F4, F5) \tag{11}$$
$$= KDE_{Final}[F3(z3), F4(z4), F5(z5)]$$
$$= \text{probability of } T \text{ given } F3, F4, F5$$

$KDE_{Final} = 3D$ Kernel Density window for joint $PDF$ of $F3$, $F4$, and $F5$ One of the advantages of using a hierarchical classifier where the intermediate features are probabilities is that missing features are easily accommodated within the mapping process by having the pattern space contain partitions of reduced dimensionality that are associated with missing measurements. For example, in classifier F6, above, if input feature F4 is missing due to a processing anomaly, then F6 is still capable of providing a classification assessment since during training that condition was incorporated into the training set either by (a) the training set has missing values, or (b) missing value are deliberately generated, permitting the classifier to estimate the detection probability albeit with a lower confidence value.

Referring now to FIG. 6, sea ice characterization by crack detection is illustrated. In an embodiment, P band SAR data is used to identify "cracks," and subsequently characterize ice. P-band MAG imagery is retrieved from the database 500. Candidate pixels for inclusion and/or potential inclusion in a crack are identified 502 as adjacent pixels with linear organization that are distinguished from surrounding pixels by their amplitude. Linear features can then be identified using Hough or Radon Transform processing although this is not meant as a limitation.

Typically, an ice crack is identified as a higher amplitude pixel than would be recorded from ice that had no cracks. These identified pixels would create short chains, each such short chain representing an ice crack.

A joining (growing) algorithm is then used 504 to connect these short chains of cracks into longer chains. So long as these shorter chains do not have any intervening sections where no return is recorded, they can be determined to be members of a contiguous crack in the ice.

Once the ice cracks are identified, the identified cracks are organized into a network of nodes connected by crack segments 506. A node is located at every crack intersection.

This crack network is then used to compute ice crack density 508.

In an embodiment, the crack network can also be used for ice crack pattern recognition by characterizing the network and comparing that characterization to signatures for various ice morphologies stored in the database.

"Leads" are places of open water within an ice floe and/or stretches of open water within fields of sea ice. Leads are caused by wind and currents acting on the ice causing it to fracture and separate, at least for a time. Many leads are small in width, but can be quite long and represent weak points in the ice floe or body of sea ice. Therefore, detection of leads within an ice floe is an important characteristic having significance for navigation and hazard mitigation. A lead differs from a crack since it represents a physical separation through the vertical extent of the ice. Over time many leads refreeze, but this re-frozen portion frequently is less strong.

Detection of open water and refrozen ice leads is performed by region clustering 512 of dark pixels and region clustering 514 of bright pixels in the X-band imagery, and similarly region clustering 516 of dark pixels and region clustering 518 of bright pixels in the P-band imagery, followed by a rule-based lead detection algorithm 520. Cluster areas above a certain area (e.g., one (1) square kilometer) and with suitable aspect ratio (say greater than 10:1) are noteworthy. For these noteworthy clusters, open water leads that have not refrozen have dark pixel clusters in both X-band and P-band, while refrozen leads have bright pixel clusters in X-band and dark pixel clusters in P-band.

As noted above, surface cracking is determined by the P-band MAG, 316, 322, and CRV images 320, 326; hence, the system can be used to map the ice fracture structure to identify potential weak zones exploitable by ice breakers.

Figure 7:
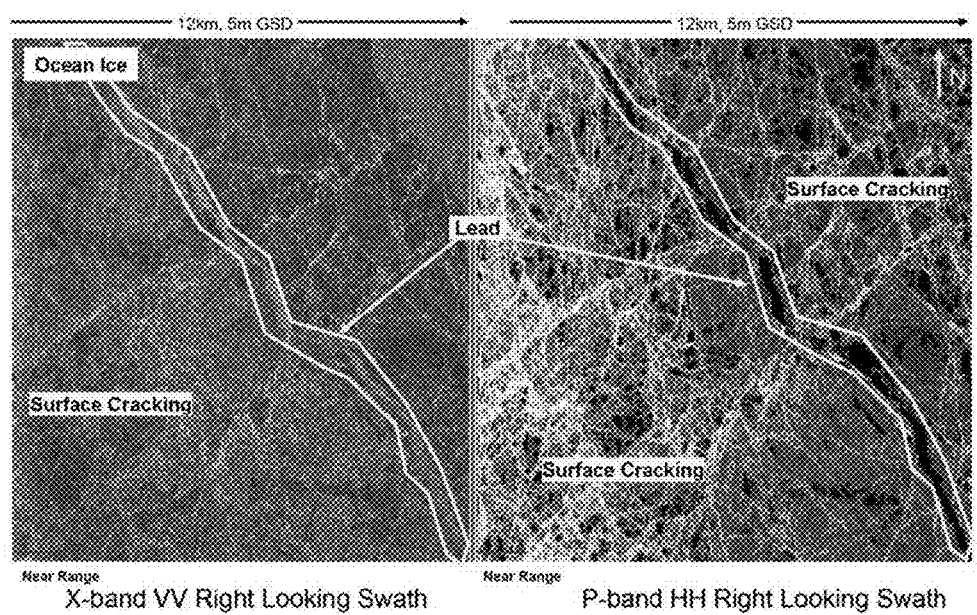
FIG. 7 illustrates SAR images from X-Band and P-Band SAR data according to an embodiment.

In the various embodiments, the system utilizes all data available for classifications including MAG, DEM, ERR, and CRV products for $X_{VV}$, $P_{HH}$, $P_{VV}$. Further, the cross-polarimetric channels (PVH, PHV) of the P-band polarimetric data can used as additional discriminators. In the various embodiments of the systems illustrated herein, the dual-band, single-pass interferometric mapping system and subsequent processing of the variously generated products has been applied to determining the following features associated with sea ice:

Classification of Ice Types:
a. First year ice, ~30-~120 cm thick
b. Multiyear ice, ~>120 cm thick
c. Open water
Measurement Ice Thickness Layers:
d. Ice floe freeboard
e. Bottom of ice
f. Ice thickness
Geolocation of Critical Ice Features:
g. Leads (small, open areas between floes)
h. Cracks and weak points in multiyear ice floes Referring now to FIG. 7, image illustrations of SAR data are presented. For example, referring to the left-hand image, X-band VV SAR imagery for a specific area of ocean ice is presented. In this image, an ice flow is imaged and a lead is depicted within the high contrast boundary. Other areas of the ice floe can be seen having different pixel values indicative of ice cracking. However, referring to the right-hand image, an image from a P-Band HH SAR data return is also presented. This image is acquired simultaneously with the previous X-Band image. However, in the P-Band HH image, the same lead is depicted in a much higher contrast fashion and is much more visible. Further, the characteristics and features of surface cracking in the ice can also be better seen by an analyst.

Various embodiments illustrated herein are not meant to be limiting. Those embodiments illustrated provide a method of using full polarimetric, single-pass P-band interferometric SAR data and to map depth horizons within sea ice. The mapping may be accomplished simultaneously using single-pass interferometric SAR data at a higher frequency, such as X-band to map the thickness of multiyear sea ice. The various embodiments utilize the decorrelation (CRV) surface layer of the X-band and P-Band SAR data as an additional input for the classification of ice into new, first year and multiyear. This characterization also leads to the generation of a map of ice structure and weak points.

The various embodiments illustrated herein may also be used in connection with other applications. For example, there are many ponds/lakes located throughout the Arctic areas (in areas having bodies of ice) and may not be well mapped. For example, such ponds are extremely complex environments with some being solid frozen water top to bottom in the winter, and others with water still in place in the winter months, many with various chemicals in suspension or impacting the characteristics of the water. Characteristics of the ice in such ponds include bubbles of the chemicals/minerals in suspension that will directly impact the signal on the P-Band Radar. Locating water sources throughout Arctic areas and areas where bodies of ice are found, is very important for oil companies and other applications. Applications of the embodiments illustrated herein, including, but without limitation, the P-band SAR data, can be used to map, e.g., Arctic ponds and better define them.

Further, in Arctic landmass areas, permafrost is being affected by climate change and seasonal changes. The physical characteristics of permafrost are important both to the ecosystem that exists in the area as well as to efforts of various companies to develop natural resources in Arctic areas and areas where bodies of ice are found. The various embodiments illustrated herein may also be used to characterize the permafrost since X-band SAR data can be used to map the surface characteristics of the permafrost and P-Band SAR data can be used to penetrate the permafrost to the level where the frozen layer occurs. Such mapping will be able to assist in characterizing permafrost regions of the world.

The preferred embodiment for the collection of the required data for the methods defined above is an airborne, single pass, full polarimetric P-band synthetic aperture radar with simultaneously collected single pass, polarimetric X-band synthetic aperture radar. The Fugro GeoSAR system is an example of such a data collection tool.

Figure 8:
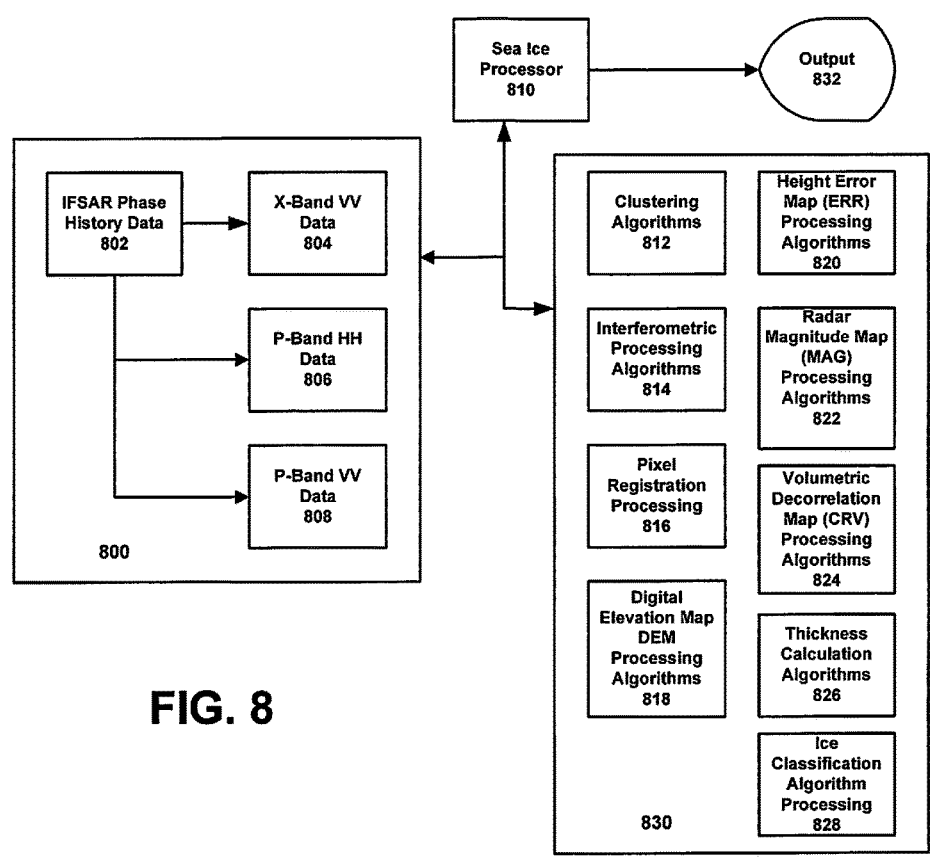
FIG. 8 illustrates a schematic overview of the ice processing system of the various embodiments.

Referring now to FIG. 8, the sea ice processing system of various embodiments is illustrated. Sea ice processor 810 comprises a data store 800 that receives and stores the IFSAR phase history data 802. The phase history data 802 is used to create X-band VV data 804, P-band HH data 806, and P-band VV data 808 that is used by sea ice processor 810 with various algorithms stored in processor memory 830.

Processor memory 830 comprises multiple algorithms that operate on the data stored in data store 800. For example and without limitation, memory 830 comprises clustering algorithms 812, interferometric processing algorithms 814 that are used on the IFSAR phase history data 802, pixel registration processing algorithms 816 that is used on the results of the interferometric processing of the IFSAR data, digital elevation map processing algorithms 818, height error map processing algorithms 820, radar magnitude map processing algorithms 822, volumetric decorrelation map processing algorithms 824, sickness calculation algorithms 826 and ice classification algorithms 828.

All of the algorithms that are used in the processor memory are used separately or in combination to provide output, 832 which may consist of, but without limitation, image products, tabular products, charts and graphs, and other products that allow visualization of the results of the sea ice processor 810 processing.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

A system and method for determining characteristics of sea ice has now been illustrated. It will be apparent to those of ordinary skill in the art that other variations system and techniques illustrated herein can be made without departing from the scope of the invention as claimed. For example, while a single pass system has been illustrated, the same techniques can be achieved with a multipass system assuming that images can be appropriately correlated. The system may be hosted on manned and unmanned aircraft or on satellites.

We claim:

1. A method of generating and using mapping layers, comprising:
   acquiring, via a synthetic aperture radar (SAR) system, full polarity SAR data over an area containing sea ice, wherein the acquired full polarity SAR data includes X-band data and P-band data;
   storing the acquired full polarity SAR data in a SAR database;
   generating layers via a processor of the SAR system by performing interferometric processing operations on the acquired full polarity SAR data that includes the X-band data and the P-band data;
   registering, by the processor, the generated layers one to another geographically; and
   determining, by the processor, a depth of the sea ice by combining the generated layers.

2. The method of claim 1, wherein acquiring full polarity SAR data over the area containing the sea ice comprises:
   simultaneously acquiring, via the SAR system, in the single pass P-band VV SAR data, P-band HH SAR data and X-band VV SAR data together with aircraft position and orientation data.

3. The method of claim 2, wherein storing the acquired full polarity SAR data in the SAR database comprises:
   storing the P-band VV SAR data, the P-band HH SAR data and the X-band VV SAR data in separate data files in the SAR database.

4. The method of claim 3, wherein generating the layers by performing the interferometric processing operations on the acquired full polarity SAR data comprises:
   performing interferometric processing operations on each of the separate data files in the SAR database; and
   generating a DEM layer, a MAG layer and a CRV layer for each of the separate data files in the SAR database based on the interferometric processing operations.

5. The method of claim 4, wherein registering the generated layers one to another geographically comprises:
   utilizing the aircraft position and orientation data to perform pixel registration geographically to the sea ice at the time of acquisition.

6. The method of claim 4, further comprising determining, by the processor of the SAR system, sea ice thickness by summing a negative of the DEM layer of the P-band HH SAR data with the DEM layer of the X-band VV SAR data.

7. The method of claim 1, wherein determining the depth of the sea ice by combining the generated layers further comprises:
   creating, by the processor of the SAR system, an elevation model for a top of the sea ice based on a X-band DEM layer;
   creating, by the processor, another elevation model for a penetration depth based on a P-band HH DEM layer;
   subtracting, by the processor, the P-band HH DEM layer from the X-band DEM layer to generate a direct measure of sea ice thickness; and
   computing, by the processor, a total uncertainty of sea ice thickness by computing a square root of a sum of square values of height errors associated with their respective DEM layers,
   wherein a ratio of the direct measure of sea ice thickness to the total uncertainty of sea ice thickness of greater than three indicates that the direct measure of sea ice thickness can be used with high confidence.

8. A synthetic aperture radar system, comprising:
   a synthetic aperture radar;
   a memory; and
   a processor coupled to the synthetic aperture radar and the memory, wherein the processor is configured with processor-executable instructions to perform operations comprising:
      scanning an area containing sea ice using the synthetic aperture radar in X-band and P-band to generate full polarity synthetic aperture radar (SAR) data including X-band data and P-band data;
      acquiring the full polarity SAR data form the synthetic aperture radar;
      storing the acquired full polarity SAR data in a SAR database;
      generating layers by performing interferometric processing operations on the acquired full polarity SAR data that includes the X-band data and the P-band data;
      registering the generated layers one to another geographically; and
      determining a depth of the sea ice by combining the generated layers.

9. The synthetic aperture radar system of claim 8, wherein the processor is configured with processor-executable instructions to perform operations such that scanning the area containing the sea ice using the synthetic aperture radar in X-band and P-band to generate full polarity synthetic aperture radar (SAR) data including X-band data and P-band data comprises:
   simultaneously acquiring in a single pass P-band VV SAR data, P-band HH SAR data and X-band VV SAR data together with aircraft position and orientation data.

10. The synthetic aperture radar system of claim 9, wherein the processor is configured with processor-executable instructions to perform operations such that storing the acquired full polarity SAR data in the SAR database comprises:
   storing the P-band VV SAR data, the P-band HH SAR data and the X-band VV SAR data in separate data files in the SAR database.

11. The synthetic aperture radar system of claim 10, wherein the processor is configured with processor-executable instructions to perform operations such that generating the layers by performing the interferometric processing operations on the acquired full polarity SAR data comprises:
   performing interferometric processing operations on each of the separate data files in the SAR database; and
   generating a DEM layer, a MAG layer and a CRV layer for each of the separate data files in the SAR database based on the interferometric processing operations.

12. The synthetic aperture radar system of claim 11, wherein the processor is configured with processor-executable instructions to perform operations such that registering the generated layers, one to another geographically comprises:
   utilizing the aircraft position and orientation data to perform pixel registration geographically to the sea ice at the time of acquisition.

13. The synthetic aperture radar system of claim 11, wherein the processor is configured with processor-executable instructions to perform operations further comprising:
   determining sea ice thickness by summing a negative of the DEM layer of the P-Band HH SAR data with the DEM layer of the X-band VV SAR data.

14. The synthetic aperture radar system of claim 8, wherein the processor is configured with processor-executable instructions to perform operations such that determining the depth of the sea ice by combining the generated layers further comprises:
   computing a total uncertainty of sea ice thickness by computing a square root of a sum of square values of height errors associated with their respective DEM layers,
   wherein a ratio of sea ice thickness to the total uncertainty of sea ice thickness of greater than three indicates that the sea ice thickness can be used with high confidence.

15. A non-transitory processor-readable storage medium having stored thereon processor-executable software instructions configured to cause a processor in a synthetic aperture radar (SAR) system to perform operations comprising:
   acquiring full polarity SAR data over an area containing sea ice, wherein the acquired full polarity SAR data includes X-band data and P-band data;
   storing the acquired full polarity SAR data in a SAR database;
   generating layers by performing interferometric processing operations on the acquired full polarity SAR data that includes the X-band data and the P-band data;
   registering the generated layers one to another geographically; and
   determining a depth of the sea ice by combining the generated layers.

16. The non-transitory processor-readable storage medium of claim 15, wherein the stored processor-executable software instructions are configured to cause the processor to perform operations such that simultaneously acquiring in the single pass full polarity SAR data over the area containing the sea ice comprises:
   simultaneously acquiring in the single pass P-band VV SAR data, P-band HH SAR data and X-band VV SAR data together with aircraft position and orientation data.

17. The non-transitory processor-readable storage medium of claim 16, wherein the stored processor-executable software instructions are configured to cause the processor to perform operations such that storing the acquired full polarity SAR data in the SAR database comprises:
   storing the P-band VV SAR data, the P-band HH SAR data and the X-band VV SAR data in separate data files in the SAR database.

18. The non-transitory processor-readable storage medium of claim 17, wherein the stored processor-executable software instructions are configured to cause the processor to perform operations such that generating the layers by performing the interferometric processing operations on the acquired full polarity SAR data comprises:
   performing interferometric processing operations on each of the separate data files in the SAR database; and
   generating a DEM layer, a MAG layer and a CRV layer for each of the separate data files in the SAR database based on the interferometric processing operations.

19. The non-transitory processor-readable storage medium of claim 18, wherein the stored processor-executable software instructions are configured to cause the processor to perform operations such that registering the generated layers, one to another geographically comprises:
   utilizing the aircraft position and orientation data to perform pixel registration geographically to the sea ice at the time of acquisition.

20. The non-transitory processor-readable storage medium of claim 18, wherein the stored processor-executable software instructions are configured to cause the processor to perform operations further comprising:
   determining sea ice thickness by summing a negative of the DEM layer of the P-band HH SAR data with the DEM layer of the X-band VVAR data.

21. The non-transitory processor-readable storage medium of claim 15, wherein the stored processor-executable software instructions are configured to cause the processor to perform operations further comprising:
   creating an elevation model for a top of the sea ice based on a X-band DEM layer;
   creating another elevation model for a penetration depth based on a P-band HH DEM layer;
   subtracting the P-band HH DEM layer from the X-band DEM layer to generate a direct measure of sea ice thickness; and
   computing a total uncertainty of sea ice thickness by computing a square root of a sum of square values of height errors associated with their respective DEM layers,
   wherein a ratio of the direct measure of sea ice thickness to the total uncertainty of sea ice thickness of greater than three indicates that the direct measure of sea ice thickness can be used with high confidence.

22. A method of using X-band and P-band synthetic aperture radar (SAR) data to generate clustered pixel data that is suitable for determining the presence of leads, comprising:
   scanning an ice floe by a SAR system to obtain X-band VV SAR data, P-band HH SAR data and P-band VV SAR;
   storing the X-band VV SAR data, the P-band HH SAR data and the P-Band VV SAR data in a database;
   performing, via a processor in the SAR system, interferometric processing on X-band VV SAR data, the P-band HH SAR data and the P-Band VV SAR;
   pixel registering the X-band VV SAR data, the P-band HH SAR data and the P-Band VV SAR to one another other;
   creating digital elevation maps (DEM), height error maps (ERR), radar magnitude (MAG) maps, and volumetric decorrelation (CRV) maps for the X-band VV SAR data, the P-band HH SAR data and the P-Band VV SAR;
   clustering dark pixels from the X-band MAG imagery;
   clustering bright pixels from the X-band MAG imagery;
   clustering dark pixels from P-band MAG imagery;
   clustering bright pixels from P-band MAG imagery; and
   performing rule based processing of the clustered pixel data to determine the presence of leads in the ice floe.

23. A synthetic aperture radar (SAR) device, comprising:
   means for obtaining X-band VV SAR data, P-band HH SAR data and P-band VV SAR data of an ice floe;
   means for storing the X-band VV SAR data, the P-band HH SAR data and the P-Band VV SAR data in a database;
   means for performing interferometric processing on X-band VV SAR data, the P-band HH SAR data and the P-Band VV SAR;
   means for pixel registering the X-band VV SAR data, the P-band HH SAR data and the P-Band VV SAR to one another other;
   means for creating digital elevation maps (DEM), height error maps (ERR), radar magnitude (MAG) maps, and volumetric decorrelation (CRV) maps for the X-band VV SAR data, the P-band HH SAR data and the P-Band VV SAR;

means for clustering dark pixels from the X-band MAG imagery;
means for clustering bright pixels from the X-band MAG imagery;
means for clustering dark pixels from P-band MAG imagery;
means for clustering bright pixels from P-band MAG imagery; and
means for performing rule based processing of the clustered pixel data to determine the presence of leads in the ice floe.

24. A non-transitory processor-readable storage medium having stored thereon processor-executable software instructions configured to cause a processor in a synthetic aperture radar (SAR) system to perform operations for using X-band and P-band SAR data to generate clustered pixel data that is suitable for determining the presence of leads, the operations comprising:
receiving X-band VV SAR data, P-band HH SAR data and P-band VV SAR data of an ice floe from the SAR system;
storing the X-band VV SAR data, the P-band HH SAR data and the P-Band VV SAR data in a database;
performing interferometric processing on X-band VV SAR data, the P-band HH SAR data and the P-Band VV SAR;
pixel registering the X-band VV SAR data, the P-band HH SAR data and the P-Band VV SAR to one another other;
creating digital elevation maps (DEM), height error maps (ERR), radar magnitude (MAG) maps, and volumetric decorrelation (CRV) maps for the X-band VV SAR data, the P-band HH SAR data and the P-Band VV SAR;
clustering dark pixels from the X-band MAG imagery;
clustering bright pixels from the X-band MAG imagery;
clustering dark pixels from P-band MAG imagery;
clustering bright pixels from P-band MAG imagery; and
performing rule based processing of the clustered pixel data to determine the presence of leads in the ice floe.

25. A method for using X-band and P-band synthetic aperture radar (SAR) data to generate a map, comprising:
scanning an ice floe with a SAR system to obtain P-band HH SAR data and P-band VV SAR data of an ice floe;
storing the P-band HH SAR data and the P-Band VV SAR data in a database;
performing, via a processor of the SAR system, interferometric processing on the P-band HH SAR data and the P-Band VV SAR;
pixel registering, via the processor, the P-band HH SAR data and the P-Band VV SAR to one another other;
creating, via the processor, radar magnitude (MAG) maps for the P-band HH SAR data and the P-Band VV SAR;
identifying, via the processor, candidate pixels from the MAG maps;
assigning, via the processor, the candidate pixels to crack segments; and
applying, via the processor, a joining algorithm to the crack segments to form an identified ice crack.

26. The method of claim 25, wherein:
identifying candidate pixels from the MAG maps comprises identifying pixels having an amplitude above a predefined threshold.

27. The method of claim 25, further comprising:
organizing the identified cracks into networks; and
computing ice crack density from the ice crack networks.

28. A synthetic aperture radar (SAR) device, comprising:
means for obtaining P-band HH SAR data and P-band VV SAR data of an ice floe;
means storing the P-band HH SAR data and the P-Band VV SAR data in a database;
means for performing interferometric processing on the P-band HH SAR data and the P-Band VV SAR;
means for pixel registering the P-band HH SAR data and the P-Band VV SAR to one another other;
means for creating radar magnitude (MAG) maps for the P-band HH SAR data and the P-Band VV SAR;
means for identifying candidate pixels from the MAG maps;
means for assigning the candidate pixels to crack segments; and
means for applying a joining algorithm to the crack segments to form an identified ice crack.

29. The method of claim 28, wherein:
the means for identifying candidate pixels from the MAG maps comprises means identifying pixels having an amplitude above a predefined threshold.

30. The method of claim 28, further comprising:
organizing the identified cracks into networks; and
computing ice crack density from the ice crack networks.

31. A non-transitory processor-readable storage medium having stored thereon processor-executable software instructions configured to cause a processor in a synthetic aperture radar (SAR) system to perform operations for using X-band and P-band SAR data to generate a map, the operations comprising:
obtaining, from the SAR system, P-band HH SAR data and P-band VV SAR data of an ice floe;
storing the P-band HH SAR data and the P-Band VV SAR data in a database;
performing interferometric processing on the P-band HH SAR data and the P-Band VV SAR;
pixel registering the P-band HH SAR data and the P-Band VV SAR to one another other;
creating radar magnitude (MAG) maps for the P-band HH SAR data and the P-Band VV SAR;
identifying candidate pixels from the MAG maps;
assigning the candidate pixels to crack segments; and
applying a joining algorithm to the crack segments to form an identified ice crack.

32. The non-transitory processor-readable storage medium of claim 31, wherein the stored processor-executable software instructions are configured to cause the processor to perform operations further comprising:
identifying candidate pixels from the MAG maps comprises identifying pixels having an amplitude above a predefined threshold.

33. The non-transitory processor-readable storage medium of claim 31, wherein the stored processor-executable software instructions are configured to cause the processor to perform operations further comprising:
organizing the identified cracks into networks; and
computing ice crack density from the ice crack networks.

* * * * *